US010420110B2

(12) United States Patent
Liu et al.

(10) Patent No.: US 10,420,110 B2
(45) Date of Patent: Sep. 17, 2019

(54) PBCH TRANSMISSION METHOD AND APPARATUS

(71) Applicant: Huawei Technologies Co., Ltd., Shenzhen (CN)

(72) Inventors: Jianqin Liu, Beijing (CN); Chuanfeng He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/370,315

(22) Filed: Mar. 29, 2019

(65) Prior Publication Data

US 2019/0254034 A1    Aug. 15, 2019

Related U.S. Application Data

(63) Continuation of application No. PCT/CN2018/085589, filed on May 4, 2018.

(30) Foreign Application Priority Data

May 4, 2017  (CN) .......................... 2017 1 0309546

(51) Int. Cl.
*H04W 72/04* (2009.01)
*H04W 72/00* (2009.01)

(52) U.S. Cl.
CPC ..... *H04W 72/0466* (2013.01); *H04W 72/005* (2013.01)

(58) Field of Classification Search
None
See application file for complete search history.

(56) References Cited

U.S. PATENT DOCUMENTS

2011/0190019 A1   8/2011 Woo et al.
2011/0255631 A1*  10/2011 Pi .......................... H03M 13/09
                                                                      375/295

(Continued)

FOREIGN PATENT DOCUMENTS

| CN | 102104413 A | 6/2011 |
| CN | 102904668 A | 1/2013 |
| CN | 103944699 A | 7/2014 |

OTHER PUBLICATIONS

3rd Generation Partnership Project; Technical Specification Group Radio Access Network; NR; Radio Resource control (RRC); Protocol specification (Release 15), 3GPP TS 38.331 V0.0.2 (Mar. 2017), 13 pages.

*Primary Examiner* — Alex Skripnikov
(74) *Attorney, Agent, or Firm* — Slater Matsil, LLP (57) ABSTRACT

This application provides a PBCH transmission method and an apparatus. The method includes: receiving, by a terminal device, a PBCH sent by a network device, where the PBCH includes seven most significant bits of an SFN of a radio frame in which the PBCH is located; determining, by the terminal device, a least significant bit of the SFN based on indication information of the least significant bit of the SFN; determining, by the terminal device based on the PBCH, a scrambling code of the PBCH, and determining two remaining bits of the SFN based on a one-to-one correspondence between the two remaining bits of the SFN and the scrambling code of the PBCH; and determining, by the terminal device, the SFN of the radio frame in which the PBCH is located.

17 Claims, 6 Drawing Sheets

(56) References Cited

U.S. PATENT DOCUMENTS

| | | | |
|---|---|---|---|
| 2015/0085795 A1* | 3/2015 | Papasakellariou | H04L 5/006 370/329 |
| 2016/0029179 A1* | 1/2016 | Kim | H04W 72/005 370/312 |
| 2016/0294528 A1* | 10/2016 | Kim | H04L 5/001 |

* cited by examiner

PBCH TRANSMISSION METHOD AND APPARATUS

CROSS-REFERENCE TO RELATED APPLICATIONS

This application is a continuation of International Application No. PCT/CN2018/085589, filed on May 4, 2018, which claims priority to Chinese Patent Application No. 201710309546.9, filed on May 4, 2017. The disclosures of the aforementioned applications are hereby incorporated by reference in their entireties.

TECHNICAL FIELD

This application relates to communications technologies, and in particular, to a physical broadcast channel (PBCH) transmission method and an apparatus.

BACKGROUND

In a 3rd Generation Partnership Project (3GPP) Long Term Evolution (LTE) system, a network side uses a PBCH to send a cell broadcast message that includes a master information block (MIB). The MIB has a total of 24 bits, including three bits for a system bandwidth. The three bits indicate one of six bandwidths: 1.4 MHz, 3 MHz, 5 MHz, 10 MHz, 15 MHz, and 20 MHz. The MIB also includes one bit for physical hybrid automatic repeat request indicator channel duration (PHICH-duration), which indicates a normal or extended PHICH-duration. The MIB also includes two bits for a PHICH-resource corresponding to a PHICH parameter Ng={1/6,1/2,1,2}. The MIB also includes eight bits for a system frame number (SFN), where the eight bits are eight most significant bits of the SFN. The MIB also includes 10 reserved bits. After a cell search procedure, a terminal device achieves subframe synchronization and frame synchronization using a synchronization signal. That is, a terminal device learns of a location of a subframe 0 in a radio frame using the synchronization signal. A PBCH is on first four orthogonal frequency division multiplexing (OFDM) symbols in a second timeslot (slot) in a subframe 0 in time domain, and occupies 72 central subcarriers in frequency domain. The PBCH is sent repeatedly for four times within a 40-ms transmission time interval (TTI). One PBCH is sent every to ms. The sent PBCHs carry same and self-decodable coded bits. Therefore, when a signal-to-interference ratio (SIR) is high enough, the terminal device can successfully decode PBCH content by receiving only one of the PBCHs sent within 40 ms. If decoding fails, the terminal device performs decoding by softly combining a current PBCH and a PBCH sent at a next to ms, until the terminal device successfully decodes the PBCH. In LTE, an SFN has a length of to bits. In a MIB broadcast by a PBCH, only the first eight bits of an SFN are broadcast, and the two remaining bits are determined based on a location, in a 40-ms period window, of a frame in which the PBCH is sent. Two least significant bits of an SFN on a PBCH in a first 10-ms frame within the 40 ms are 00; two least significant bits of an SFN on a PBCH in a second 10-ms frame within the 40 ms are 01; two least significant bits of an SFN on a PBCH in a third 10-ms frame within the 40 ms are 10; and two least significant bits of an SFN on a PBCH in a fourth 10-ms frame within the 40 ms are 11. Within each 40 ms when a base station sends PBCHs, the base station uses four different phases of a PBCH scrambling code to represent different occasions. Different phases correspond to different 10-ms frames. In other words, two least significant bits of an SFN corresponding to one phase are different from two least significant bits of an SFN corresponding to another phase. In addition, the scrambling code is reset every 40 ms. After receiving the PBCH, the terminal device attempts to decode the PBCH using each of the four phases. If decoding succeeds, the terminal device knows in which 10-ms frame within 40 ms the base station sends the PBCH, determines the two least significant bits of the SFN based on a mapping relationship between the four different phases of the scrambling code and the two least significant bits of SFNs, and finally determines all the to bits of the SFN.

In a fifth generation (5 Generation, 5G) system, a higher spectrum band is used than a spectrum band used in LTE. Therefore, radio signal transmission attenuation increases, and radio signal coverage reduces. In this case, a beamforming technology of massive multiple-input multiple-output (massive MIMO) is used by using a plurality of antennas of a base station to obtain high antenna gains, so as to complement path losses. Multi-beam transmission is supported for synchronization signals and PBCHs in 5G, to facilitate reception of terminal devices in a cell. Multi-beam transmission of synchronization signals (SS) is implemented by defining an SS burst set. One SS burst set includes one or more SS bursts, and one SS burst includes one or more SS blocks. One SS block carries a synchronization signal of one beam. Therefore, one SS burst set includes synchronization signals of beams that are of a same quantity as SS blocks in the cell. One SS block includes one symbol for a primary synchronization signal (PSS), one symbol for a secondary synchronization signal (SSS), and two symbols for PBCHs. The SSS may be used as a demodulation reference signal for the PBCH. An SS burst set sending periodicity includes a default 20-ms periodicity and network-indicated periodicities. The network-indicated periodicities include 5 ms, to ms, 20 ms, 40 ms, 80 ms, and 160 ms. In 5G, a PBCH is sent in an SS block, and a PBCH ITI is 80 ms. Therefore, within 80 ms, the base station may send 4 PBCHs at the default 20-ms SS block sending periodicity, or may send 16 PBCHs at an indicated 5-ms SS block sending periodicity, or may send eight PBCHs at an indicated 10-ms SS block sending periodicity, and so on.

In a 5G system, because a PBCH is sent in an SS block while there are a plurality of SS block sending periodicities, including the default periodicity and the network-indicated periodicities, the PBCH is no longer sent at a fixed interval of to ms as in LTE. Therefore, in 5G, a solution is needed how to use a PBCH to indicate an SFN of a radio frame in which the PBCH is located.

SUMMARY

This application provides a PBCH transmission method and an apparatus, so as to use a PBCH to indicate an SFN of a radio frame in which the PBCH is located.

According to a first aspect, this application provides a PBCH transmission method. The method includes receiving, by a terminal device, a PBCH sent by a network device, where the PBCH includes seven most significant bits of an SFN of a radio frame in which the PBCH is located. The method also includes determining, by the terminal device, a least significant bit of the SFN based on indication information of the least significant bit of the SFN. The method also includes determining, by the terminal device based on the PBCH, at least one of a scrambling code, a CRC check mask, or a redundancy version of the PBCH. The method also includes determining two remaining bits of the SFN based on a one-to-one correspondence between the two remaining bits of the SFN and the at least one of the scrambling code, the CRC check mask, or the redundancy version of the PBCH. The two remaining bits are a second least significant bit and a third least significant bit of the SFN. The method also includes determining, by the terminal device based on the least significant bit, the seven most significant bits, the second least significant bit, and the third least significant bit of the SFN, the SFN of the radio frame in which the PBCH is located. This implements that the terminal device can determine the two remaining bits of the SFN by performing blind detection on only at least one of the following: four scrambling codes, four CRC check masks, or four redundancy versions. In comparison with an implementation of directly setting eight scrambling codes to determine an SFN of a frame in which a PBCH is located, a quantity of blind detections is reduced from 8 to 4, thereby reducing blind detection complexity. In addition, the foregoing implementation can be applicable to scenarios with different quantities of PBCHs sent within one PBCH ITI. To be specific, the foregoing implementation can be applicable to scenarios in which one PBCH, two PBCHs, four PBCHs, eight PBCHs, or 16 PBCHs can be sent within one ITI. An application scope is relatively wide.

In a possible design of the first aspect, the indication information of the least significant bit of the SFN is indicated by one bit at a preset location on the PBCH.

In a possible design of the first aspect, the indication information of the least significant bit of the SFN is indicated by a relative location relationship between a primary synchronization signal and a secondary synchronization signal in a synchronization signal block in which the PBCH is located.

In a possible design of the first aspect, a scrambling code corresponding to two remaining bits of one SFN and a scrambling code corresponding to two remaining bits of another SFN are different segments of one scrambling code sequence, where the two remaining bits of the one SFN are different from the two remaining bits of the another SFN; or a scrambling code corresponding to two remaining bits of one SFN and a scrambling code corresponding to two remaining bits of another SFN are different scrambling code sequences, where the two remaining bits of the one SFN are different from the two remaining bits of the another SFN.

In a possible design of the first aspect, a CRC check mask corresponding to two remaining bits of one SFN and a CRC check mask corresponding to two remaining bits of another SFN are different mask sequences, where the two remaining bits of the one SFN are different from the two remaining bits of the another SFN.

In a possible design of the first aspect, a redundancy version corresponding to two remaining bits of one SFN and a redundancy version corresponding to two remaining bits of another SFN are different redundancy versions obtained by performing different rate matching on encoded information carried on the PBCH, where the two remaining bits of the one SFN are different from the two remaining bits of the another SFN.

According to a second aspect, this application provides a PBCH transmission method. The method includes determining, by a network device, an SFN of a radio frame in which a PBCH is located, adding seven most significant bits of the SFN to the PBCH, and determining indication information of a least significant bit of the SFN. The method also includes determining, by the network device, at least one of a scrambling code, a CRC check mask, or a redundancy version of the PBCH. The at least one of the scrambling code, the CRC check mask, or the redundancy version is the same within one radio frame group, and is different in different radio frame groups. Each radio frame group includes two radio frames for which SFN mod 8=2n and SFN mod 8=2n+1 among eight consecutive radio frames in which a radio frame for which SFN mod 8=0 is used as a start frame, where n=0, 1, 2, 3. Within one radio frame group, two remaining bits of an SFN of one radio frame are the same as two remaining bits of an SFN of the other radio frame in the radio frame group, and the two remaining bits are a second least significant bit and a third least significant bit of the SFN. The method also includes processing, by the network device, the PBCH based on the at least one of the scrambling code, the CRC check mask, or the redundancy version of the PBCH, and sending the PBCH to a terminal device in the radio frame corresponding to the SFN.

In a possible design of the second aspect, the indication information of the least significant bit of the SFN is indicated by one bit at a preset location on the PBCH.

In a possible design of the second aspect, the indication information of the least significant bit of the SFN is indicated by a relative location relationship between a primary synchronization signal and a secondary synchronization signal in a synchronization signal block in which the PBCH is located.

In a possible design of the second aspect, a scrambling code corresponding to two remaining bits of one SFN and a scrambling code corresponding to two remaining bits of another SFN are different segments of one scrambling code sequence, where the two remaining bits of the one SFN are different from the two remaining bits of the another SFN; or a scrambling code corresponding to two remaining bits of one SFN and a scrambling code corresponding to two remaining bits of another SFN are different scrambling code sequences, where the two remaining bits of the one SFN are different from the two remaining bits of the another SFN.

In a possible design of the second aspect, a CRC check mask corresponding to two remaining bits of one SFN and a CRC check mask corresponding to two remaining bits of another SFN are different mask sequences, where the two remaining bits of the one SFN are different from the two remaining bits of the another SFN.

In a possible design of the second aspect, a redundancy version corresponding to two remaining bits of one SFN and a redundancy version corresponding to two remaining bits of another SFN are different redundancy versions obtained by performing different rate matching on encoded information carried on the PBCH, where the two remaining bits of the one SFN are different from the two remaining bits of the another SFN.

According to a third aspect, this application provides a terminal device. The terminal device includes a receiving module, configured to receive a PBCH sent by a network device, where the PBCH includes seven most significant bits of an SFN of a radio frame in which the PBCH is located. The terminal device also includes a determining module, configured to determine a least significant bit of the SFN based on indication information of the least significant bit of the SFN. The determining module is further configured to: determine, based on the PBCH, at least one of a scrambling code, a CRC check mask, or a redundancy version of the PBCH, and determine two remaining bits of the SFN based on a one-to-one correspondence between the two remaining bits of the SFN and the at least one of the scrambling code, the CRC check mask, or the redundancy version of the PBCH. The two remaining bits are a second least significant bit and a third least significant bit of the SFN. The determining module is further configured to determine, based on the least significant bit, the seven most significant bits, the second least significant bit, and the third least significant bit of the SFN, the SFN of the radio frame in which the PBCH is located.

In a possible design of the third aspect, the indication information of the least significant bit of the SFN is indicated by one bit at a preset location on the PBCH.

In a possible design of the third aspect, the indication information of the least significant bit of the SFN is indicated by a relative location relationship between a primary synchronization signal and a secondary synchronization signal in a synchronization signal block in which the PBCH is located.

In a possible design of the third aspect, a scrambling code corresponding to two remaining bits of one SFN and a scrambling code corresponding to two remaining bits of another SFN are different segments of one scrambling code sequence, where the two remaining bits of the one SFN are different from the two remaining bits of the another SFN; or a scrambling code corresponding to two remaining bits of one SFN and a scrambling code corresponding to two remaining bits of another SFN are different scrambling code sequences, where the two remaining bits of the one SFN are different from the two remaining bits of the another SFN.

In a possible design of the third aspect, a CRC check mask corresponding to two remaining bits of one SFN and a CRC check mask corresponding to two remaining bits of another SFN are different mask sequences, where the two remaining bits of the one SFN are different from the two remaining bits of the another SFN.

In a possible design of the third aspect, a redundancy version corresponding to two remaining bits of one SFN and a redundancy version corresponding to two remaining bits of another SFN are different redundancy versions obtained by performing different rate matching on encoded information carried on the PBCH, where the two remaining bits of the one SFN are different from the two remaining bits of the another SFN.

According to a fourth aspect, this application provides a network device. The network device includes a determining module, configured to: determine an SFN of a radio frame in which a PBCH is located, add seven most significant bits of the SFN to the PBCH, and determine indication information of a least significant bit of the SFN. The determining module is further configured to determine at least one of a scrambling code, a CRC check mask, or a redundancy version of the PBCH, where the at least one of the scrambling code, the CRC check mask, or the redundancy version is the same within one radio frame group, and is different in different radio frame groups. Each radio frame group includes two radio frames for which SFN mod 8=2n and SFN mod 8=2n+1 among eight consecutive radio frames in which a radio frame for which SFN mod 8=0 is used as a start frame, where n=0, 1, 2, 3. Within one radio frame group, two remaining bits of an SFN of one radio frame are the same as two remaining bits of an SFN of the other radio frame, and the two remaining bits are a second least significant bit and a third least significant bit of the SFN. The network device also includes a sending module, configured to: process the PBCH based on the at least one of the scrambling code, the CRC check mask, or the redundancy version of the PBCH, and send the PBCH to a terminal device in the radio frame corresponding to the SFN.

In a possible design of the fourth aspect, the indication information of the least significant bit of the SFN is indicated by one bit at a preset location on the PBCH.

In a possible design of the fourth aspect, the indication information of the least significant bit of the SFN is indicated by a relative location relationship between a primary synchronization signal and a secondary synchronization signal in a synchronization signal block in which the PBCH is located.

In a possible design of the fourth aspect, a scrambling code corresponding to two remaining bits of one SFN and a scrambling code corresponding to two remaining bits of another SFN are different segments of one scrambling code sequence, where the two remaining bits of the one SFN are different from the two remaining bits of the another SFN; or a scrambling code corresponding to two remaining bits of one SFN and a scrambling code corresponding to two remaining bits of another SFN are different scrambling code sequences, where the two remaining bits of the one SFN are different from the two remaining bits of the another SFN.

In a possible design of the fourth aspect, a CRC check mask corresponding to two remaining bits of one SFN and a CRC check mask corresponding to two remaining bits of another SFN are different mask sequences, where the two remaining bits of the one SFN are different from the two remaining bits of the another SFN.

In a possible design of the fourth aspect, a redundancy version corresponding to two remaining bits of one SFN and a redundancy version corresponding to two remaining bits of another SFN are different redundancy versions obtained by performing different rate matching on encoded information carried on the PBCH, where the two remaining bits of the one SFN are different from the two remaining bits of the another SFN.

According to a fifth aspect, this application provides a communications system, including any terminal device provided in the third aspect and any network device provided in the fourth aspect.

According to a sixth aspect, this application provides a terminal device, including: a transceiver; a memory, configured to store instructions; and a processor, connected to both the memory and the transceiver. The processor is configured to execute the instructions, so as to perform the following steps when executing the instructions: receiving a PBCH sent by a network device, where the PBCH includes seven most significant bits of an SFN of a radio frame in which the PBCH is located; determining a least significant bit of the SFN based on indication information of the least significant bit of the SFN; determining, based on the PBCH, at least one of a scrambling code, a CRC check mask, or a redundancy version of the PBCH, and determining two remaining bits of the SFN based on a one-to-one correspondence between the two remaining bits of the SFN and the at least one of the scrambling code, the CRC check mask, or the redundancy version of the PBCH, where the two remaining bits are a second least significant bit and a third least significant bit of the SFN; and determining, based on the least significant bit, the seven most significant bits, the second least significant bit, and the third least significant bit of the SFN, the SFN of the radio frame in which the PBCH is located.

According to a seventh aspect, this application provides a network device, including: a transceiver; a memory, configured to store instructions; and a processor, connected to both the memory and the transceiver. The processor is configured to execute the instructions, so as to execute the following steps when executing the instructions: determining an SFN of a radio frame in which a PBCH is located, adding seven most significant bits of the SFN to the PBCH, determining indication information of a least significant bit of the SFN; determining at least one of a scrambling code, a CRC check mask, or a redundancy version of the PBCH, where the at least one of the scrambling code, the CRC check mask, or the redundancy version is the same within one radio frame group, and is different in different radio frame groups, and each radio frame group includes two radio frames for which SFN mod 8=2n and SFN mod 8=2n+1 among eight consecutive radio frames in which a radio frame for which SFN mod 8=0 is used as a start frame, where n=0, 1, 2, 3, and where within one radio frame group, two remaining bits of an SFN of one radio frame are the same as two remaining bits of an SFN of the other radio frame, and the two remaining bits are a second least significant bit and a third least significant bit of the SFN; and processing the PBCH based on the at least one of the scrambling code, the CRC check mask, or the redundancy version of the PBCH, and sending the PBCH to a terminal device in the radio frame corresponding to the SFN.

According to an eighth aspect, this application further provides a readable storage medium that contains an executable instruction. When at least one processor of a terminal device executes the executable instruction, the terminal device is configured to execute the method in the first aspect or any one of the possible implementations of the first aspect.

According to a ninth aspect, this application further provides a readable storage medium that contains an executable instruction. When at least one processor of a network device executes the executable instruction, the network device is configured to execute the method in the second aspect or any one of the possible implementations of the second aspect.

According to a tenth aspect, this application further provides a program product. The program product includes an executable instruction, and the executable instruction is stored in a computer readable storage medium. At least one processor of a terminal device may read the computer executable instruction from the readable storage medium, and the at least one processor executes the executable instruction, so that the terminal device implements the method in the first aspect or any one of the possible implementations of the first aspect.

According to an eleventh aspect, this application further provides a program product. The program product includes an executable instruction, and the executable instruction is stored in a computer readable storage medium. At least one processor of a network device may read the computer executable instruction from the readable storage medium, and the at least one processor executes the executable instruction, so that the network device implements the method in the second aspect or any one of the possible implementations of the second aspect.

DETAILED DESCRIPTION OF ILLUSTRATIVE EMBODIMENTS

Figure 1:
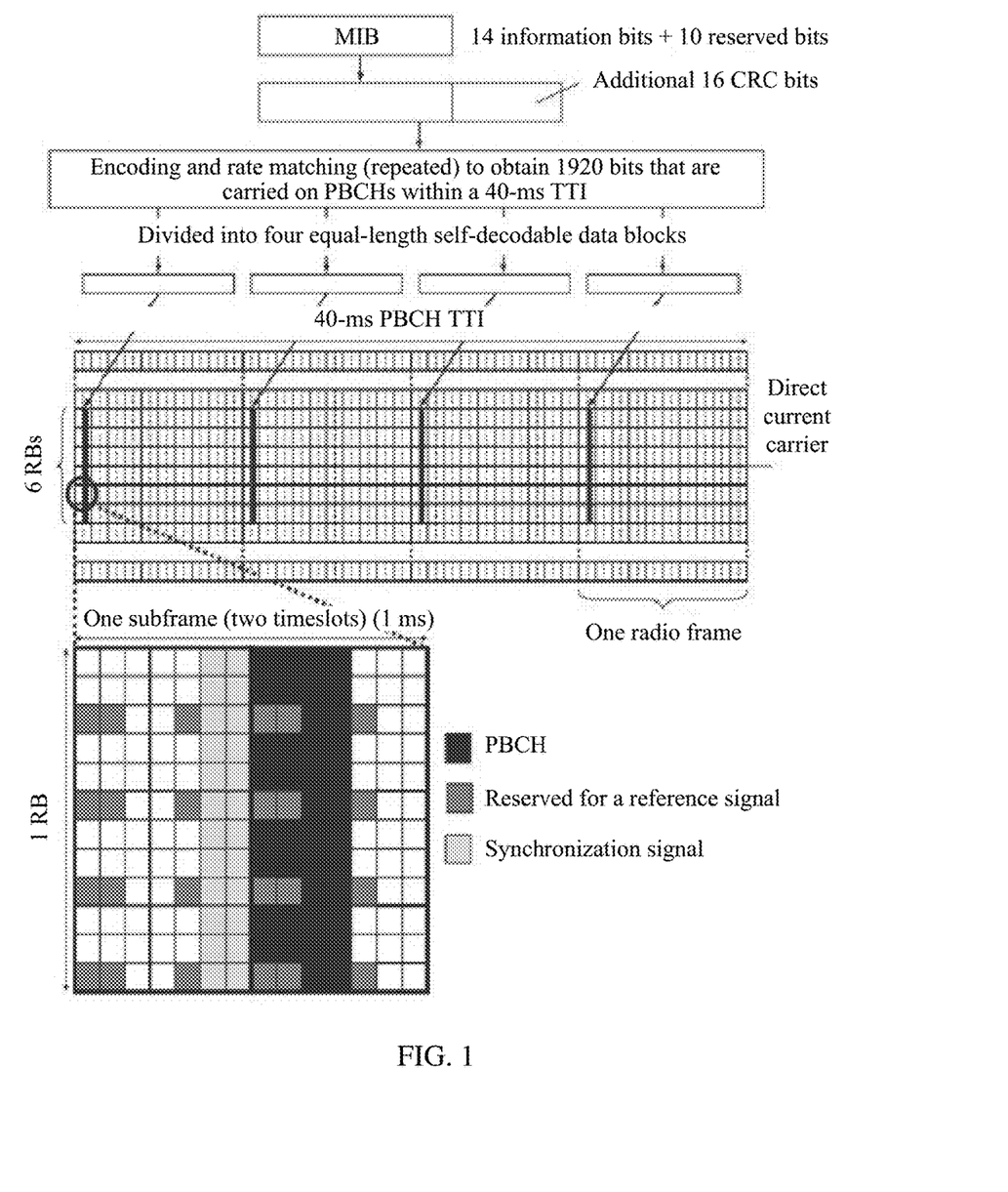
FIG. 1 is a schematic diagram of a PBCH sending location in an LTE system.

A PBCH transmission method provided in this application is applied to a 5G system. A network device sends a PBCH to a terminal device, so as to send a MIB of a cell through the PBCH. After receiving the PBCH, the terminal device determines, based on the MIB carried on the PBCH, eight most significant bits of an SFN of a radio frame in which the PBCH is located. FIG. 1 is a schematic diagram of a PBCH sending location in an LTE system. In the LTE system, the PBCH sending location is shown in FIG. 1. A master information block includes 14 information bits, to reserved bits, and a 16-bit cyclic redundancy check (CRC) code. Encoding is performed to obtain 120 bits of encoded data, and then rate matching is performed to output 1920 bits. This is equivalent to 16 repetitions of the 120 bits of encoded data. Then, the 1920 bits of data is scrambled to obtain 1920 bits of scrambled data, with a scrambling length of 1920 bits. The 1920 bits of scrambled data is evenly divided into four segments, with 480 bits in each segment. Therefore, a final quantity of bits carried on a PBCH sent in a radio frame is 480 bits. Within a 40-ms ITI of the PBCH, the PBCH is sent every 10 ms. The PBCH is on first four OFDM symbols in a second timeslot in a subframe 0 in the time domain, and occupies 72 subcarriers in the frequency domain. For the sent PBCHs, scrambling codes of the PBCHs are different, and in each PBCH there is a mapping relationship between the scrambling code and two least significant bits of the SFN. Therefore, after receiving the PBCH, the terminal device may determine the scrambling code of the received PBCH while decoding the PBCH, and finally determine the two least significant bits of the SFN. Finally, the terminal device determines 10 bits of the SFN of the radio frame in which the PBCH is located. However, in 5G, a PBCH is sent in an SS block, while there is a plurality of SS block sending periodicities. In addition, in 5G, a PBCH ITI is 80 ms. Within one ITI, a quantity of PBCHs sent by the network device is indefinite. Therefore, an LTE manner of indicating an SFN of a radio frame in which a PBCH is located can no longer be used. This application intends to implement indication of an SFN of a radio frame in which a PBCH is located in a 5G system.

Figure 2:
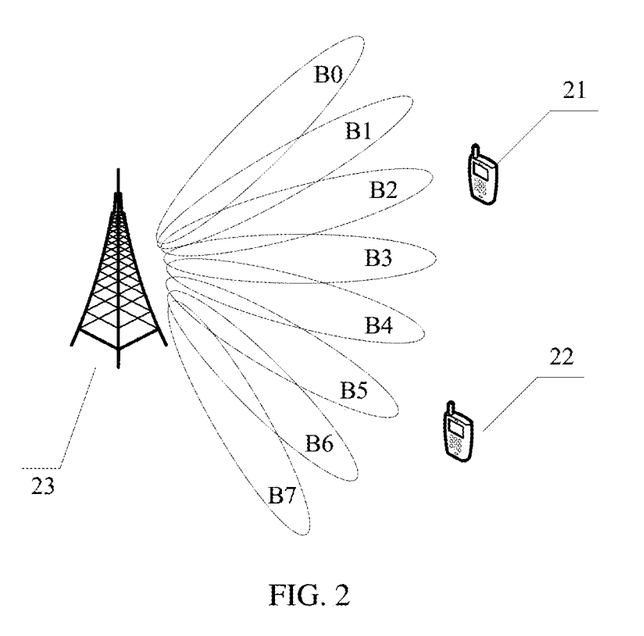
FIG. 2 is a schematic diagram of an application scenario according to this application.

FIG. 2 is a schematic diagram of an application scenario according to this application. As shown in FIG. 2, this application is applied to a system that uses a beamforming technology. A cell includes a total of eight beams B0 to B7 sent by a network device 23. The beam B2 can cover only a terminal device 21, and a terminal device 22 cannot be covered by the beam B2. Multi-beam transmission is supported for synchronization signals and PBCHs in the system, to facilitate reception of terminal devices in the cell. According to a PBCH transmission method provided in this application, a network device determines an SFN of a radio frame in which a PBCH is located, adds seven most significant bits of the SFN to the PBCH, and determines indication information of a least significant bit of the SFN. The network device determines at least one of a scrambling code, a CRC check mask, or a redundancy version of the PBCH. The at least one of the scrambling code, the CRC check mask, or the redundancy version is the same within one radio frame group, and is different in different radio frame groups. Each radio frame group includes two radio frames for which SFN mod 8=2n and SFN mod 8=2n+1 among eight consecutive radio frames in which a radio frame for which SFN mod 8=0 is used as a start frame, where n=0, 1, 2, 3. Within one radio frame group, two remaining bits of an SFN of one radio frame are the same as two remaining bits of an SFN of the other radio frame. The two remaining bits are a second least significant bit and a third least significant bit of the SFN. The network device processes the PBCH based on the at least one of the scrambling code, the CRC check mask, or the redundancy version of the PBCH, and sends the PBCH to a terminal device in the radio frame corresponding to the SFN. The terminal device receives the PBCH sent by the network device. The PBCH includes the seven most significant bits of the SFN of the radio frame in which the PBCH is located. The terminal device determines the least significant bit of the PBCH based on the indication information of the least significant bit of the SFN. The terminal device determines, based on the PBCH, the at least one of the scrambling code, the CRC check mask, or the redundancy version of the PBCH, and determines the two remaining bits of the SFN based on a one-to-one correspondence between the two remaining bits of the SFN and the at least one of the scrambling code, the CRC check mask, or the redundancy version of the PBCH. The terminal device determines, based on the least significant bit, the seven most significant bits, the second least significant bit, and the third least significant bit, the SFN of the radio frame in which the PBCH is located. This implements that, in a 5G system, the terminal device can determine the two remaining bits of the SFN by performing blind detection on only at least one of the following: four scrambling codes, four CRC check masks, or four redundancy versions. In comparison with an implementation of directly setting eight scrambling codes to determine an SFN of a radio frame in which a PBCH is located, a quantity of blind detections is reduced from 8 to 4, thereby reducing blind detection complexity. In addition, the PBCH transmission method can be applicable to scenarios with different quantities of PBCHs sent within one PBCH ITI. To be specific, the foregoing implementation can be applicable to scenarios in which one PBCH, two PBCHs, four PBCHs, eight PBCHs, or 16 PBCHs can be sent within one ITI. An application scope is relatively wide.

The following details a receive end signal obtaining method provided in this application with reference to the accompanying drawing.

Figure 3:
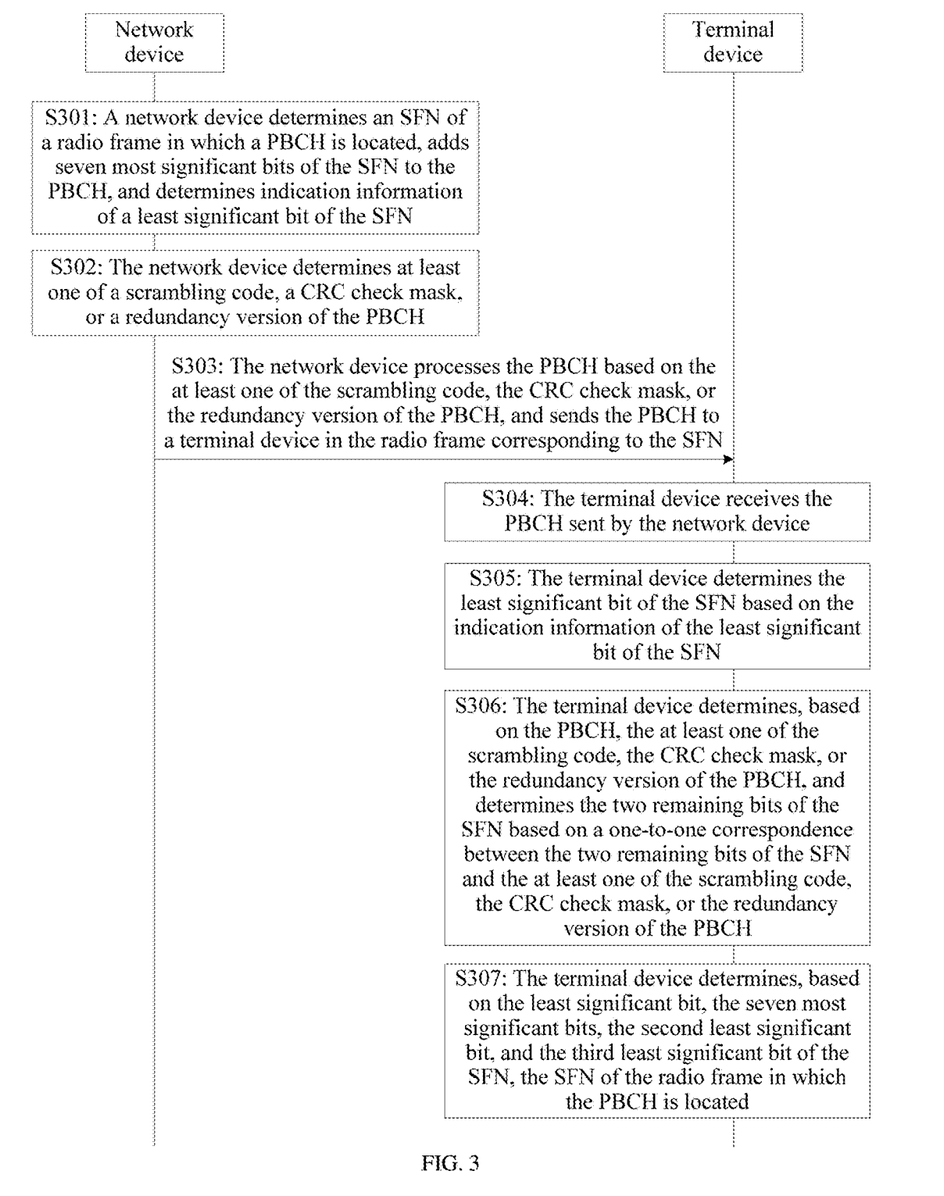
FIG. 3 is a signaling interaction diagram of a PBCH transmission method according to this application.

FIG. 3 is a signaling interaction diagram of a PBCH transmission method according to this application. As shown in FIG. 3, the PBCH transmission method provided in this application includes the following steps.

S301: A network device determines an SFN of a radio frame in which a PBCH is located, adds seven most significant bits of the SFN to the PBCH, and determines indication information of a least significant bit of the SFN.

Specifically, the network device in this application may be a base station (base transceiver station, BTS) in Global System for Mobile Communications (GSM) or Code Division Multiple Access (CDMA), or may be a NodeB (NB) in Wideband Code Division Multiple Access (WCDMA), or may be an evolved NodeB (eNB or eNodeB), a relay node, or an access point in LTE, or a new radio access technology (NR) base station in a 5G network, or the like. This is not limited herein.

When determining to send a PBCH to the terminal device, the network device first determines a radio frame in which the PBCH is sent, that is, an SFN of the radio frame in which the PBCH is located. An SFN includes to bits. In this application, it is defined that bits of an SFN are numbered from left to right as a first bit, a second bit, a third bit, . . . , a ninth bit, and a tenth bit, respectively. The first bit to the seventh bit of the SFN are referred to as seven most significant bits of the SFN, the tenth bit is referred to as a least significant bit of the SFN, the ninth bit is referred to as a second least significant bit of the SFN, and the eighth bit is referred to as a third least significant bit of the SFN.

In this application, the network device adds the seven most significant bits of the SFN to the PBCH. This means that the network device notifies, in an explicit way, the terminal device of the seven most significant bits of the SFN of the radio frame in which the PBCH is located. The least significant bit of the SFN may be indicated by the indication information of the least significant bit, and the indication information may be an indication in an explicit way or an implicit way.

In a possible implementation, the indication information of the least significant bit of the SFN is indicated by one bit at a preset location on the PBCH. Therefore, the PBCH carries eight bits of the SFN: the seven most significant bits and the least significant bit. For example, if the one bit at the preset location is 0, it indicates that the least significant bit of the SFN of the radio frame in which the PBCH is located is 0. If the one bit at the preset location is 1, it indicates that the least significant bit of the SFN of the radio frame in which the PBCH is located is 1. It can be understood that, the one bit at the preset location may alternatively be 1, and it indicates that the least significant bit of the SFN of the radio frame in which the PBCH is located is 0; or the one bit at the preset location is 0, and it indicates that the least significant bit of the SFN of the radio frame in which the PBCH is located is 1. This is not limited in this application.

Figure 4A:
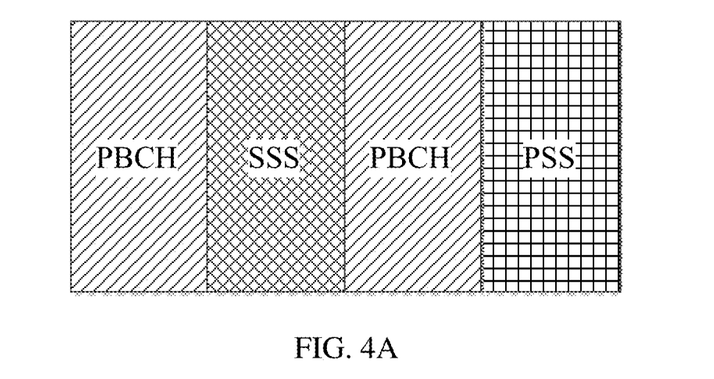
FIG. 4A is a schematic diagram of an implementation of indication information of a least significant bit of an SFN according to an embodiment shown in FIG. 3.
Figure 4B:
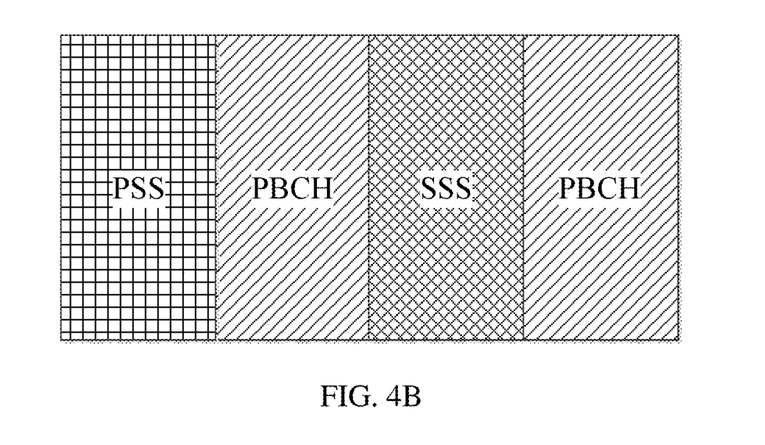
FIG. 4B is a schematic diagram of another implementation of indication information of a least significant bit of an SFN according to an embodiment shown in FIG. 3.

In another possible implementation, the indication information of the least significant bit of the SFN is indicated by a relative location relationship between an SSS and a PSS in an SS block in which the PBCH is located. One SS block includes four symbols: one symbol for an SSS, one symbol for a PSS, and two symbols for PBCHs. The relative location relationship between the SSS and the PSS is a timing relationship between the SSS and the PSS. FIG. 4A is a schematic diagram of an implementation of the indication information of the least significant bit of the SFN according to the embodiment shown in FIG. 3. As shown in FIG. 4A, the SSS is preceding the PSS. FIG. 4B is a schematic diagram of another implementation of the indication information of the least significant bit of the SFN according to the embodiment shown in FIG. 3. As shown in FIG. 4B, the PSS is preceding the SSS. Different relative location relationships between the SSS and the PSS indicate different least significant bits of the SFN. For example, it may be defined that, when the SSS is preceding the PSS, the least significant bit of the SFN is 1; and when the PSS is preceding the SSS, the least significant bit of the SFN is 0.

In this application, that the network device determines indication information of a least significant bit of the SFN indicates that the network device determines both an implementation of the indication information of the least significant bit of the SFN and specific content of the indication information of the least significant bit. To be specific, the network device determines whether the indication information of the least significant bit is indicated by the one bit at the preset location on the PBCH or indicated by the relative location relationship between the SSS and the PSS in the SS block in which the PBCH is located, and determines, based on the least significant bit of the SFN, a specific value of the one bit at the preset location or a specific relative location relationship between the SSS and the PSS.

S302: The network device determines at least one of a scrambling code, a CRC check mask, or a redundancy version of the PBCH.

The at least one of the scrambling code, the CRC check mask, or the redundancy version is the same within one radio frame group, and is different in different radio frame groups. Each radio frame group includes two radio frames for which SFN mod 8=2n and SFN mod 8=2n+1 among eight consecutive radio frames in which a radio frame for which SFN mod 8=0 is used as a start frame, where n=0, 1, 2, 3. Within one radio frame group, two remaining bits of an SFN of one radio frame are the same as two remaining bits of an SFN of the other radio frame. The two remaining bits are a second least significant bit and a third least significant bit of the SFN.

Specifically, when sending the PBCH, the network device processes the PBCH using the at least one of the scrambling code, the CRC check mask, or the redundancy version of the PBCH. For example, the network device uses the scrambling code to scramble the PBCH, uses the CRC check mask to encode the CRC code of the PBCH, or performs puncturing on encoded information carried on the PBCH, which means performing rate matching to form a redundancy version. It can be understood that the network device: may scramble the PBCH and encode the CRC code of the PBCH; or may scramble the PBCH, encode the CRC code of the PBCH, and perform rate matching on the encoded information carried on the PBCH. In this application, the network device may determine the at least one of the scrambling code, the CRC check mask or the redundancy version of the PBCH based on a one-to-one correspondence between the two remaining bits of the SFN of the radio frame in which the PBCH is located and the at least one of the scrambling code, the CRC check mask, or the redundancy version.

In this application, a radio frame group is defined as two radio frames for which SFN mod 8=2n and SFN mod 8=2n+1 among eight consecutive radio frames in which a radio frame for which SFN mod 8=0 is used as a start frame, where n=0, 1, 2, 3. Therefore, the eight consecutive radio frames in which the radio frame for which SFN mod 8=0 is used as the start frame may be divided into four radio frame groups: radio frames for which SFN mod 8=0 and SFN mod 8=1 are one group, radio frames for which SFN mod 8=2 and SFN mod 8=3 are one group, radio frames for which SFN mod 8=4 and SFN mod 8=5 are one group, and radio frames for which mod 8=6 and SFN mod 8=7 are one group. That the at least one of the scrambling code, the CRC check mask, or the redundancy version is the same within one radio frame group means that, when only the scrambling code is used to process the PBCH, a plurality of PBCHs sent within a radio frame group all have a same scrambling code; when only the CRC check mask is used to process the PBCH, a plurality of PBCHs sent within a radio frame group all have a same CRC check mask; when only the redundancy version is used to process the PBCH, a plurality of PBCHs sent within a radio frame group all have a same redundancy version; when both the scrambling code and the CRC check mask are used to process the PBCH, a plurality of PBCHs sent within a radio frame group all have a same scrambling code and a same CRC check mask; when both the scrambling code and the redundancy version are used to process the PBCH, a plurality of PBCHs sent within a radio frame group all have a same scrambling code and a same redundancy version; or when both the CRC check mask and the redundancy version are used to process the PBCH, a plurality of PBCHs sent within a radio frame group all have a same CRC check mask and a same redundancy version; or when the scrambling code, the CRC check mask, and the redundancy version are used to process the PBCH, a plurality of PBCHs sent within a radio frame group all have a same scrambling code, a same CRC check mask, and a same redundancy version. There is a mapping relationship between the two remaining bits of the SFN of the radio frame in which the PBCH is located and the at least one of the scrambling code, the CRC check mask, and the redundancy version. In addition, within a radio frame group, the at least one of the scrambling code, the CRC check mask, and the redundancy version is the same. Therefore, within a radio frame group, two remaining bits of an SFN of one radio frame in which a PBCH is located are the same as two remaining bits of an SFN of the other radio frame in which a PBCH is located. In other words, two remaining bits in a radio frame for which SFN mod 8=2n are the same as two remaining bits in a radio frame for which SFN mod 8=2n+1. It should be noted that, a reason why eight consecutive radio frames are used is that a PBCH TTI is 80 ms. It can be learned that there is a mapping relationship between the radio frame group, the two remaining bits of the SFN, and the at least one of the scrambling code, the CRC check mask, and the redundancy version. For example, two remaining bits of an SFN corresponding to the radio frame group including the two radio frames for which SFN mod 8=0 and SFN mod 8=1 are 00; two remaining bits of an SFN corresponding to the radio frame group including the two radio frames for which SFN mod 8=2 and SFN mod 8=3 are 01; two remaining bits of an SFN corresponding to the radio frame group including the two radio frames for which SFN mod 8=4 and SFN mod 8=5 are 10; and two remaining bits of an SFN corresponding to the radio frame group including the two radio frames for which SFN mod 8=6 and SFN mod 8=7 are 11.

A quantity of PBCHs sent within one radio frame group is determined based on an SS block sending periodicity of the network device. The SS block sending periodicity of the network device includes two types: a default periodicity and indicated periodicities. The default periodicity is 20 ms, and the indicated periodicities include 5 ms, to ms, 20 ms, 40 ms, 80 ms, and 160 ms. The SS block sending periodicity indicates an interval at which PBCHs are sent within one PBCH ITI.

Figure 5A:
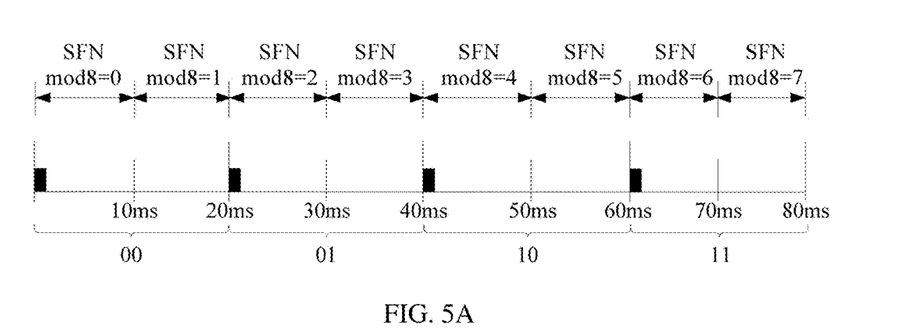
FIG. 5A is a schematic diagram of locations of PBCHs sent within an 80-ms ITI at a sending interval of 20 ms according to an embodiment shown in FIG. 3.
Figure 5B:
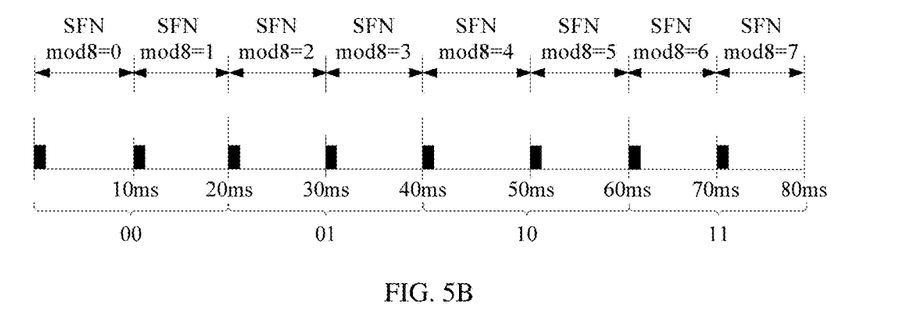
FIG. 5B is a schematic diagram of locations of PBCHs sent within an 80-ms ITI at a sending interval of to ms according to an embodiment shown in FIG. 3.
Figure 5C:
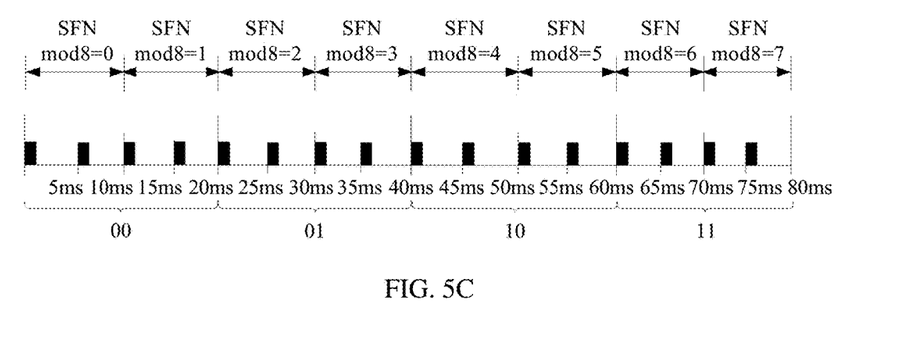
FIG. 5C is a schematic diagram of locations of PBCHs sent within an 80-ms ITI at a sending interval of 5 ms according to an embodiment shown in FIG. 3.

FIG. 5A is a schematic diagram of locations of PBCHs sent within an 80-ms ITI at a sending interval of 20 ms according to an embodiment shown in FIG. 3. As shown in FIG. 5A, when the sending interval is 20 ms, four PBCHs can be sent within one ITI at four locations: SFN mod 8=0, SFN mod 8=2, SFN mod 8=4, and SFN mod 8=6, respectively. In this case, within one radio frame group, only one PBCH is sent. FIG. 5B is a schematic diagram of locations of PBCHs sent within an 80-ms ITI at a sending interval of to ms according to an embodiment shown in FIG. 3. As shown in FIG. 5B, when the sending interval is to ms, eight PBCHs can be sent within one ITI at eight locations: SFN mod 8=0, SFN mod 8=1, SFN mod 8=2, SFN mod 8=3, SFN mod 8=4, SFN mod 8=5, SFN mod 8=6, SFN mod 8=7, respectively. FIG. 5C is a schematic diagram of locations of PBCHs sent within an 80-ms ITI at a sending interval of 5 ms according to an embodiment shown in FIG. 3. As shown in FIG. 5C, when the sending interval is 5 ms, 16 PBCHs can be sent within one ITI. Within one radio frame group, four PBCHs can be sent.

S303: The network device processes the PBCH based on the at least one of the scrambling code, the CRC check mask, or the redundancy version of the PBCH, and sends the PBCH to a terminal device in the radio frame corresponding to the SFN.

Specifically, after determining the at least one of the scrambling code, the CRC check mask, or the redundancy version of the PBCH, the network device processes the PBCH. The network device sends the PBCH in the radio frame in which the PBCH is located, that is, sends the PBCH in the radio frame corresponding to the SFN of the radio frame in which the PBCH is located. It can be understood that, the network device also sends the at least one of the scrambling code, the CRC check mask, or the redundancy version of the PBCH while sending the PBCH.

S304: The terminal device receives the PBCH sent by the network device.

The PBCH includes the seven most significant bits of the SFN of the radio frame in which the PBCH is located.

Specifically, the terminal device in this application may be a wireless terminal or a wired terminal. The wireless terminal may be a device providing voice and/or data connectivity to a user, or a handheld device having a wireless connection function, or another processing device connected to a wireless modem. The wireless terminal may communicate with one or more core networks by using a radio access network (RAN). The wireless terminal may be a mobile terminal, such as a mobile phone (or referred to as a "cellular" phone) and a computer provided with a mobile terminal, for example, a portable, pocket-sized, handheld, computer built-in, or in-vehicle mobile apparatus, and exchanges voice and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may alternatively be referred to as a system, a subscriber unit, a subscriber station, a mobile station, a mobile console, a remote station, a remote terminal, an access terminal, a user terminal, a user agent, or a user device (user device or user equipment). This is not limited herein.

After receiving the PBCH, the terminal device can determine the seven most significant bits, carried on the PBCH, of the SFN of the radio frame in which the PBCH is located.

S305: The terminal device determines the least significant bit of the SFN based on the indication information of the least significant bit of the SFN.

Specifically, when the indication information of the least significant bit of the SFN is indicated by the one bit at the preset location on the PBCH, the terminal device may determine the least significant bit of the SFN based on one bit information at the preset location on the PBCH. When the indication information of the least significant bit of the SFN is indicated by the relative location relationship between the SSS and the PSS in the SS block in which the PBCH is located, after receiving the PBCH, the terminal device determines the least significant bit of the SFN based on the relative location relationship between the SSS and the PSS in the SS block in which the PBCH is located. In addition, the SSS may be used as a demodulation reference signal for the PBCH. In the SS block, the SSS is located between symbols of two PBCHs. In this way, the SSS is relatively close to the symbols of both PBCHs, improving PBCH demodulation performance.

A correspondence between the one bit at the preset location on the PBCH and the least significant bit of the SFN, and a correspondence between the least significant bit of the SFN and the relative location relationship between the SSS and the PSS may be notified to the terminal device by the network device in advance.

S306: The terminal device determines, based on the PBCH, the at least one of the scrambling code, the CRC check mask, or the redundancy version of the PBCH, and determines the two remaining bits of the SFN based on a one-to-one correspondence between the two remaining bits of the SFN and the at least one of the scrambling code, the CRC check mask, or the redundancy version of the PBCH.

Specifically, the terminal device may determine the at least one of the scrambling code, the CRC check mask, or the redundancy version of the PBCH in a PBCH decoding process. The terminal device may determine, based on the one-to-one correspondence between the two remaining bits of the SFN and the at least one of the scrambling code, the CRC check mask, or the redundancy version of the PBCH, the two remaining bits of the SFN of the radio frame in which the PBCH is located. The one-to-one correspondence between the two remaining bits of the SFN and the at least one of the scrambling code, the CRC check mask, or the redundancy version of the PBCH means that, when only the scrambling code is used to process the PBCH, two remaining bits of an SFN corresponding to one scrambling code are different from two remaining bits of an SFN corresponding to another scrambling code; when only the CRC check mask is used to process the PBCH, two remaining bits of an SFN corresponding to one CRC check mask are different from two remaining bits of an SFN corresponding to another CRC check mask; when only the redundancy version is used to process PBCH, two remaining bits of an SFN corresponding to one redundancy version are different from two remaining bits of an SFN corresponding to another redundancy version; and when both the scrambling code and the redundancy version are used to process the PBCH, two remaining bits of an SFN corresponding to one group of scrambling code and redundancy version are different from two remaining bits of an SFN corresponding another group of scrambling code and redundancy version.

S307: The terminal device determines, based on the least significant bit, the seven most significant bits, the second least significant bit, and the third least significant bit of the SFN, the SFN of the radio frame in which the PBCH is located.

Specifically, the terminal device may determine, based on the least significant bit, the seven most significant bits, the second least significant bit, and the third least significant bit of the SFN, the SFN of the radio frame in which the PBCH is located.

Optionally, a scrambling code corresponding to two remaining bits of one SFN and a scrambling code corresponding to two remaining bits of another SFN are different segments of one scrambling code sequence, where the two remaining bits of the one SFN are different from the two remaining bits of the another SFN; or a scrambling code corresponding to two remaining bits of one SFN and a scrambling code corresponding to two remaining bits of another SFN are different scrambling code sequences, where the two remaining bits of the one SFN are different from the two remaining bits of the another SFN.

Optionally, a CRC check mask corresponding to two remaining bits of one SFN and a CRC check mask corresponding to two remaining bits of another SFN are different mask sequences, where the two remaining bits of the one SFN are different from the two remaining bits of the another SFN.

Optionally, a redundancy version corresponding to two remaining bits of one SFN and a redundancy version corresponding to two remaining bits of another SFN are different redundancy versions obtained by performing different rate matching on encoded information carried on the PBCH, where the two remaining bits of the one SFN are different from the two remaining bits of the another SFN. A rate matching process is a process for performing puncturing on the encoded information carried on the PBCH.

It should be noted that, that two remaining bits in one SFN are different from two remaining bits in another SFN means that, for different SFNs, for example, two SFNs: an SFN 1 and an SFN 2, two remaining bits of the SFN 1 are different from two remaining bits of the SFN 2, or at least one bit of two remaining bits of the SFN 1 is different from at least one bit of two remaining bits of the SFN 2.

On the terminal device side, when determining the two remaining bits of the SFN, the terminal device only needs to perform four blind detections because only two bits need to be determined. In comparison with a manner of directly setting eight scrambling codes to distinguish between eight SFNs within one ITI, blind detection complexity is reduced.

In a case of a PBCH sending interval of 40 ms, 80 ms, or 160 ms, this PBCH transmission method is also applicable.

In a circumstance of poor channel quality, the terminal device may combine a plurality of PBCHs for decoding, in order to successfully decode the PBCH.

Optionally, based on a preset combination interval, the terminal device may combine PBCHs separated by the combination interval among a plurality of PBCHs. The preset combination interval may be 20 ms and/or 40 ms. A possible combination manner is that, when the terminal device unsuccessfully decodes the PBCH by combining PBCHs separated by a combination interval of 20 ms among a plurality of PBCHs, the terminal device may combine PBCHs separated by a combination interval of 40 ms among a plurality of PBCHs.

Optionally, according to a combination rule indicated by the network device, the terminal device may combine, in a combination manner indicated in the combination rule, PBCHs among a plurality of PBCHs that are within a combination interval indicated in the combination rule. The combination rule includes the combination manner and/or the combination interval.

Optionally, the terminal device may determine a first periodicity for synchronization signal sending by the network device; determine, based on a mapping relationship between the first periodicity for synchronization signal sending and the combination interval, a combination interval corresponding to the first periodicity; and combine, based on the combination interval, PBCHs separated by the combination interval among a plurality of PBCHs. When the first periodicity for synchronization signal sending is 5 ms, to ms, or 20 ms, the combination interval is 20 ms, when the first periodicity for synchronization signal sending is 40 ms, the combination interval is 40 ms; or when the first periodicity for synchronization signal sending is 80 ms or 160 ms, combination is not performed.

According to the PBCH transmission method provided in this application, the network device determines the SFN of the radio frame in which the PBCH is located, adds the seven most significant bits of the SFN to the PBCH, and determines the indication information of the least significant bit of the SFN. The network device determines the at least one of the scrambling code, the CRC check mask, or the redundancy version of the PBCH. The at least one of the scrambling code, the CRC check mask, or the redundancy version is the same within one radio frame group, and is different in different radio frame groups. Each radio frame group includes two radio frames for which SFN mod 8=2n and SFN mod 8=2n+1 among eight consecutive radio frames in which a radio frame for which SFN mod 8=0 is used as a start frame, where n=0, 1, 2, 3. Within one radio frame group, two remaining bits of an SFN of one radio frame are the same as two remaining bits of an SFN of the other radio frame. The two remaining bits are the second least significant bit and the third least significant bit of the SFN. The network device processes the PBCH based on the at least one of the scrambling code, the CRC check mask, or the redundancy version of the PBCH, and sends the PBCH to the terminal device in the radio frame corresponding to the SFN. The terminal device receives the PBCH sent by the network device. The PBCH includes the seven most significant bits of the SFN of the radio frame in which the PBCH is located. The terminal device determines the least significant bit of the PBCH based on the indication information of the least significant bit of the SFN. The terminal device determines, based on the PBCH, the at least one of the scrambling code, the CRC check mask, or the redundancy version of the PBCH, and determines the two remaining bits of the SFN based on the one-to-one correspondence between the two remaining bits of the SFN and the at least one of the scrambling code, the CRC check mask, or the redundancy version of the PBCH. The terminal device determines, based on the least significant bit, the seven most significant bits, the second least significant bit, and the third least significant bit, the SFN of the radio frame in which the PBCH is located. This implements that, in a 5G system, the terminal device can determine the two remaining bits of the SFN by performing blind detection on only at least one of the following: four scrambling codes, four CRC check masks, or four redundancy versions. In comparison with an implementation of directly setting eight scrambling codes to determine an SFN of a radio frame in which a PBCH is located, a quantity of blind detections is reduced from 8 to 4, thereby reducing blind detection complexity. In addition, the PBCH transmission method can be applicable to scenarios with different quantities of PBCHs sent within one PBCH TTI. To be specific, the foregoing implementation can be applicable to scenarios in which one PBCH, two PBCHs, four PBCHs, eight PBCHs, or 16 PBCHs can be sent within one ITI. An application scope is relatively wide.

Figure 6:
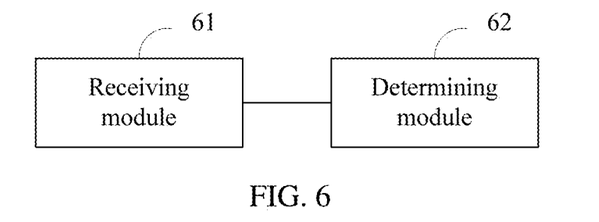
FIG. 6 is a schematic structural diagram of Embodiment 1 of a terminal device according to this application.

FIG. 6 is a schematic structural diagram of Embodiment 1 of a terminal device according to this application. As shown in FIG. 6, the terminal device provided in this application includes the following modules.

A receiving module 61 is configured to receive a PBCH sent by a network device.

The PBCH includes seven most significant bits of an SFN of a radio frame in which the PBCH is located.

A determining module 62 is configured to determine a least significant bit of the SFN based on indication information of the least significant bit of the SFN.

The determining module 62 is further configured to: determine, based on the PBCH, at least one of a scrambling code, a CRC check mask, or a redundancy version of the PBCH, and determine two remaining bits of the SFN based on a one-to-one correspondence between the two remaining bits of the SFN and the at least one of the scrambling code, the CRC check mask, or the redundancy version of the PBCH.

The two remaining bits are a second least significant bit and a third least significant bit of the SFN.

The determining module 62 is further configured to determine, based on the least significant bit, the seven most significant bits, the second least significant bit, and the third least significant bit of the SFN, the SFN of the radio frame in which the PBCH is located.

Optionally, the indication information of the least significant bit of the SFN is indicated by one bit at a preset location on the PBCH.

Optionally, the indication information of the least significant bit of the SFN is indicated by a relative location relationship between a primary synchronization signal and a secondary synchronization signal in a synchronization signal block in which the PBCH is located.

A scrambling code corresponding to two remaining bits of one SFN and a scrambling code corresponding to two remaining bits of another SFN are different segments of one scrambling code sequence, where the two remaining bits of the one SFN are different from the two remaining bits of the another SFN; or a scrambling code corresponding to two remaining bits of one SFN and a scrambling code corresponding to two remaining bits of another SFN are different scrambling code sequences, where the two remaining bits of the one SFN are different from the two remaining bits of the another SFN.

A CRC check mask corresponding to two remaining bits of one SFN and a CRC check mask corresponding to two remaining bits of another SFN are different mask sequences, where the two remaining bits of the one SFN are different from the two remaining bits of the another SFN.

A redundancy version corresponding to two remaining bits of one SFN and a redundancy version corresponding to two remaining bits of another SFN are different redundancy versions obtained by performing different rate matching on encoded information carried on the PBCH, where the two remaining bits of the one SFN are different from the two remaining bits of the another SFN.

The terminal device provided in this application is specifically configured to execute the method executed by the terminal device in the embodiment shown in FIG. 3, with a similar implementation process, a similar technical principle, and a similar technical effect. Details are not described herein again.

Figure 7:
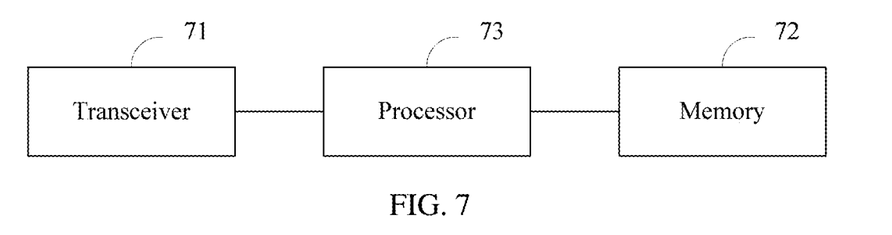
FIG. 7 is a schematic structural diagram of Embodiment 2 of a terminal device according to this application.

FIG. 7 is a schematic structural diagram of Embodiment 2 of a terminal device according to this application. As shown in FIG. 7, the terminal device provided in this application includes: a transceiver 71; a memory 72, configured to store an instruction; and a processor 73, connected to both the memory 72 and the transceiver 71, and configured to execute the instruction, so as to execute the following steps when executing the instruction: receiving a PBCH sent by a network device, where the PBCH includes seven most significant bits of an SFN of a radio frame in which the PBCH is located; determining a least significant bit of the SFN based on indication information of the least significant bit of the SFN; determining, based on the PBCH, at least one of a scrambling code, a CRC check mask, or a redundancy version of the PBCH, and determining two remaining bits of the SFN based on a one-to-one correspondence between the two remaining bits of the SFN and the at least one of the scrambling code, the CRC check mask, or the redundancy version of the PBCH, where the two remaining bits are a second least significant bit and a third least significant bit of the SFN; and determining, based on the least significant bit, the seven most significant bits, the second least significant bit, and the third least significant bit of the SFN, the SFN of the radio frame in which the PBCH is located.

The terminal device provided in this application is specifically configured to execute the method executed by the terminal device in the embodiment shown in FIG. 3, with a similar implementation process, a similar technical principle, and a similar technical effect. Details are not described herein again.

Figure 8:
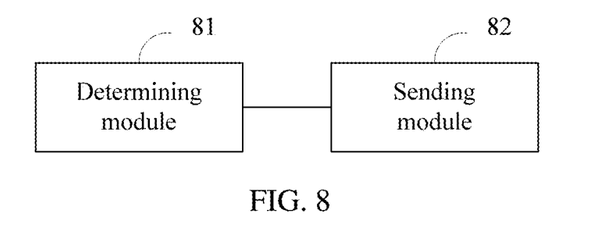
FIG. 8 is a schematic structural diagram of Embodiment 1 of a network device according to this application.

FIG. 8 is a schematic structural diagram of Embodiment 1 of a network device according to this application. As shown in FIG. 8, the network device provided in this application includes the following modules.

A determining module 81 is configured to: determine an SFN of a radio frame in which a PBCH is located, add seven most significant bits of the SFN to the PBCH, and determine indication information of a least significant bit of the SFN.

The determining module 81 is further configured to determine at least one of a scrambling code, a CRC check mask, or a redundancy version of the PBCH.

The at least one of the scrambling code, the CRC check mask, or the redundancy version is the same within one radio frame group, and is different in different radio frame groups. Each radio frame group includes two radio frames for which SFN mod 8=2n and SFN mod 8=2n+1 among eight consecutive radio frames in which a radio frame for which SFN mod 8=0 is used as a start frame, where n=0, 1, 2, 3. Within one radio frame group, two remaining bits of an SFN of one radio frame are the same as two remaining bits of an SFN of the other radio frame. The two remaining bits are a second least significant bit and a third least significant bit of the SFN.

The sending module 82 is configured to: process the PBCH based on the at least one of the scrambling code, the CRC check mask, or the redundancy version of the PBCH, and send the PBCH to a terminal device in the radio frame corresponding to the SFN.

Optionally, the indication information of the least significant bit of the SFN is indicated by one bit at a preset location on the PBCH.

Optionally, the indication information of the least significant bit of the SFN is indicated by a relative location relationship between a primary synchronization signal and a secondary synchronization signal in a synchronization signal block in which the PBCH is located.

A scrambling code corresponding to two remaining bits of one SFN and a scrambling code corresponding to two remaining bits of another SFN are different segments of one scrambling code sequence, where the two remaining bits of the one SFN are different from the two remaining bits of the another SFN; or a scrambling code corresponding to two remaining bits of one SFN and a scrambling code corresponding to two remaining bits of another SFN are different scrambling code sequences, where the two remaining bits of the one SFN are different from the two remaining bits of the another SFN.

A CRC check mask corresponding to two remaining bits of one SFN and a CRC check mask corresponding to two remaining bits of another SFN are different mask sequences, where the two remaining bits of the one SFN are different from the two remaining bits of the another SFN.

A redundancy version corresponding to two remaining bits of one SFN and a redundancy version corresponding to two remaining bits of another SFN are different redundancy versions obtained by performing different rate matching on encoded information carried on the PBCH, where the two remaining bits of the one SFN are different from the two remaining bits of the another SFN.

The network device provided in this application is specifically configured to execute the method executed by the network device in the embodiment shown in FIG. 3, with a similar implementation process, a similar technical principle, and a similar technical effect. Details are not described herein again.

Figure 9:
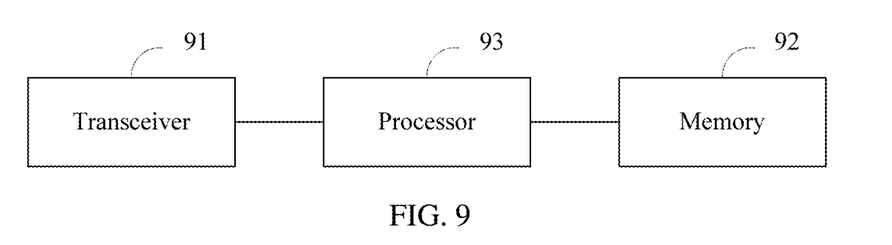
FIG. 9 is a schematic structural diagram of Embodiment 2 of a network device according to this application.

FIG. 9 is a schematic structural diagram of Embodiment 2 of a network device according to this application. As shown in FIG. 9, the network device provided in this application includes: a transceiver 91; a memory 92, configured to store an instruction; and a processor 93, connected to both the memory 92 and the transceiver 91, and configured to execute the instruction, so as to execute the following steps when executing the instruction: determining an SFN of a radio frame in which a PBCH is located, adding seven most significant bits of the SFN to the PBCH, and determining indication information of a least significant bit of the SFN; determining at least one of a scrambling code, a CRC check mask, or a redundancy version of the PBCH, where the at least one of the scrambling code, the CRC check mask, or the redundancy version is the same within one radio frame group, and is different in different radio frame groups, and each radio frame group includes two radio frames for which SFN mod 8=2n and SFN mod 8=2n+1 among eight consecutive radio frames in which a radio frame for which SFN mod 8=0 is used as a start frame, where n=0, 1, 2, 3, within one radio frame group, two remaining bits of an SFN of one radio frame are the same as two remaining bits of an SFN of the other radio frame, and the two remaining bits are a second least significant bit and a third least significant bit of the SFN; and processing the PBCH based on the at least one of the scrambling code, the CRC check mask, or the redundancy version of the PBCH, and sending the PBCH to a terminal device in the radio frame corresponding to the SFN.

The network device provided in this application is specifically configured to execute the method executed by the network device in the embodiment shown in FIG. 3, with a similar implementation process, a similar technical principle, and a similar technical effect. Details are not described herein again.

This application further provides a communications system. The communications system includes the terminal device in the embodiment shown in FIG. 6 or FIG. 7, and the network device in the embodiment shown in FIG. 8 or FIG. 9.

This application further provides a readable storage medium that contains an executable instruction. When at least one processor of the terminal device executes the executable instruction, the terminal device is configured to execute the method executed by the terminal device in the embodiment shown in FIG. 3.

This application further provides a readable storage medium that contains an executable instruction. When at least one processor of the network device executes the executable instruction, the network device is configured to execute the method executed by the network device in the embodiment shown in FIG. 3.

This application further provides a program product. The program product includes an executable instruction, and the executable instruction is stored in a computer readable storage medium. At least one processor of a terminal device may read the computer executable instruction from the readable storage medium, and the at least one processor executes the executable instruction, so that the terminal device implements the method executed by the terminal device in the embodiment shown in FIG. 3.

This application further provides a program product. The program product includes an executable instruction, and the executable instruction is stored in a computer readable storage medium. At least one processor of a network device may read the computer executable instruction from a readable storage medium, and the at least one processor executes the executable instruction, so that the network device implements the method executed by the network device in the embodiment shown in FIG. 3.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

What is claimed is:

1. A method, comprising:
receiving a physical broadcast channel (PBCH) from a network device; and
processing the PBCH based on a first scrambling code of the PBCH;
wherein the first scrambling code is one of four scrambling codes, a combination of a second least significant bit and a third least significant bit of a system frame number (SFN) indicates one value of four values, and the four scrambling codes have a one-to-one correspondence with the four values.

2. The method according to claim 1, wherein the PBCH is received in a radio frame with the SFN, and the one value of four values indicated by the combination of the second least significant bit and the third least significant bit of the SFN corresponds to the first scrambling code.

3. The method according to claim 1, wherein the four scrambling codes are different segments of one scrambling code sequence.

4. The method according to claim 1, wherein the four scrambling codes are four different scrambling sequences.

5. An apparatus, comprising:
a receiver, configure to receive a physical broadcast channel (PBCH) from a network device; and
a processor, configure to process the PBCH based on a first scrambling code of the PBCH;
wherein the first scrambling code is one of four scrambling codes, a combination of a second least significant bit and a third least significant bit of a system frame number (SFN) indicates one value of four values, and the four scrambling codes have a one-to-one correspondence with the four values.

6. The apparatus according to claim 5, wherein the PBCH is received in a radio frame with the SFN, and the one value of four values indicated by the combination of the second least significant bit and the third least significant bit of the SFN corresponds to the first scrambling code.

7. The apparatus according to claim 5, wherein the four scrambling codes are different segments of one scrambling code sequence.

8. The apparatus according to claim 5, wherein the four scrambling codes are four different scrambling sequences.

9. The apparatus according to claim 5, wherein the apparatus is a terminal device.

10. A non-transitory computer readable medium, comprising computer program instructions which when executed by one or more processors cause the one or more processors to:

receive a physical broadcast channel (PBCH) from a network device; and     process the PBCH based on a first scrambling code of the PBCH;

wherein the first scrambling code is one of four scrambling codes, a combination of a second least significant bit and a third least significant bit of a system frame number (SFN) indicates one value of four values, and the four scrambling codes have a one-to-one correspondence with the four values.

11. The non-transitory computer readable medium according to claim 10, wherein the PBCH is received in a radio frame with the SFN, and the one value of four values indicated by the combination of the second least significant bit and the third least significant bit of the SFN corresponds to the first scrambling code.

12. The non-transitory computer readable medium according to claim 11, wherein the four scrambling codes are different segments of one scrambling code sequence.

13. The non-transitory computer readable medium according to claim 11, wherein the four scrambling codes are four different scrambling sequences.

14. An apparatus, comprising a memory and one or more processors, wherein the one or more processors are configured to:

receive a physical broadcast channel (PBCH) from a network device; and     process the PBCH based on a first scrambling code of the PBCH;

wherein the first scrambling code is one of four scrambling codes, a combination of a second least significant bit and a third least significant bit of a system frame number (SFN) indicates one value of four values, and the four scrambling codes have a one-to-one correspondence with the four values.

15. The apparatus according to claim 14, wherein the PBCH is received in a radio frame with the SFN, and the one value of four values indicated by the combination of the second least significant bit and the third least significant bit of the SFN corresponds to the first scrambling code.

16. The apparatus according to claim 14, wherein the four scrambling codes are different segments of one scrambling code sequence.

17. The apparatus according to claim 14, wherein the four scrambling codes are four different scrambling sequences.

* * * * *